UNITED STATES PATENT OFFICE.

CHARLES HENRY SHARMAN, OF ALLENBY ROAD, FOREST HILL, COUNTY OF KENT, ENGLAND.

COMPOSITION FOR COATING VEGETABLE PRODUCTS.

SPECIFICATION forming part of Letters Patent No. 351,213, dated October 19, 1886.

Application filed June 1, 1886. Serial No. 203,834. (No specimens.) Patented in England July 28, 1885, No. 9,053.

*To all whom it may concern:*

Be it known that I, CHARLES HENRY SHARMAN, a subject of the Queen of Great Britain, residing at Allenby Road, Forest Hill, in the county of Kent, England, seedsman, have invented a certain new and useful Process or Method for Preserving all Kinds of Vegetable Products, (for which I have obtained Letters Patent in England, No. 9,053, bearing date July 28, 1885;) and I do hereby declare that the following is a full, clear, and exact description of the invention, which will enable others skilled in the art to which it appertains to make and use the same.

This invention has for its object a new and improved process or method of preserving all kinds of vegetable products.

Hitherto in exposing fruit and other articles of vegetable growth for any length of time for purposes of exhibition such articles are subjected to rapid deterioration and decay and are soon rendered useless, and in some cases it becomes necessary to exhibit models of the articles instead of the actual articles, which models are both expensive and unsatisfactory.

In carrying out my invention I coat the article to be preserved with a solution formed of the following ingredients, viz., wax, gelatine or resin, and sulphur, and in the following proportions: wax, eight parts; resin or gelatine, one part; sulphur, one part. Coloring-matter is sometimes mixed with the above materials to suit the articles to be preserved, or such coloring-matter may be applied after undergoing the above process. The vegetable product is coated with or dipped into this solution once, or as many times as may be necessary, and the solution forms a hard coating upon the article and preserves the form and shape and prevents the same from shrinking.

By the use of my improved process in preserving articles of vegetable production the actual grown fruit or vegetable may be exhibited without any risk of decay, and the expense of models and replacing exhibits are avoided.

Having now particularly described and ascertained the nature of my said invention, and in what manner the same is to be performed, I declare that what I claim is—

The new composition for coating vegetable products for the purpose of preserving them, consisting of wax, eight parts; resin or gelatine, one part, and sulphur, one part, substantially as herein set forth.

In testimony whereof I have hereunto set my hand this 14th day of May, 1886.

CHARLES HENRY SHARMAN.

Witnesses:
    GEO. C. DOWNING,
        8 *Quality Court, London, W. C.*
    ERNEST LIDDELL,
        28 *Southampton Blds., London, W. C.*